United States Patent
Rafter

(10) Patent No.: US 6,839,981 B2
(45) Date of Patent: Jan. 11, 2005

(54) TAPE MEASURE ATTACHMENT

(75) Inventor: William Michael Rafter, Santa Fe, NM (US)

(73) Assignee: Tape Ease, LLC, Santa Fe, NM (US)

( * ) Notice: Subject to any disclaimer, the term of this patent is extended or adjusted under 35 U.S.C. 154(b) by 0 days.

(21) Appl. No.: 10/659,996

(22) Filed: Sep. 11, 2003

(65) Prior Publication Data

US 2004/0049939 A1 Mar. 18, 2004

Related U.S. Application Data

(60) Provisional application No. 60/410,906, filed on Sep. 13, 2002.

(51) Int. Cl.$^7$ .................................................. G01B 3/10
(52) U.S. Cl. .......................................... 33/770; 33/758
(58) Field of Search .......................... 33/758, 755, 768, 33/770

(56) References Cited

U.S. PATENT DOCUMENTS

| | | | |
|---|---|---|---|
| RE14,947 E | | 9/1920 | Ballou |
| 1,798,476 A | * | 3/1931 | Langsner ..................... 33/758 |
| 3,473,235 A | | 10/1969 | Quenot ........................ 33/137 |
| 3,965,579 A | | 6/1976 | Woods ......................... 33/137 |
| D320,168 S | | 9/1991 | Archer ........................ D10/74 |
| 5,421,100 A | * | 6/1995 | Leore .......................... 33/770 |
| 5,481,913 A | * | 1/1996 | Ito et al. ................... 73/504.16 |
| 5,542,184 A | * | 8/1996 | Beard .......................... 30/293 |
| 5,600,894 A | | 2/1997 | Blackman et al. ............ 33/758 |
| 5,782,007 A | * | 7/1998 | Harris ......................... 33/768 |
| 5,845,412 A | * | 12/1998 | Arcand ........................ 33/758 |
| 5,894,677 A | | 4/1999 | Hoffman ...................... 33/758 |
| 6,115,931 A | | 9/2000 | Arcand ........................ 33/666 |
| 6,223,443 B1 | | 5/2001 | Jacobs ....................... 33/27.03 |
| 6,295,739 B1 | | 10/2001 | Kraft ........................... 33/758 |
| 6,370,790 B1 | | 4/2002 | Stenger ....................... 33/758 |
| 6,442,863 B1 | * | 9/2002 | Poineau et al. ............... 33/758 |
| 6,510,622 B2 | | 1/2003 | Laughlin et al. .............. 33/770 |
| 6,546,644 B2 | | 4/2003 | Poineau et al. ............... 33/758 |
| D474,702 S | | 5/2003 | Levinson ..................... D10/74 |
| 6,568,099 B2 | * | 5/2003 | Bergeron ..................... 33/770 |

* cited by examiner

*Primary Examiner*—Christopher W. Fulton
(74) *Attorney, Agent, or Firm*—Linda Flewellen Gould

(57) ABSTRACT

An apparatus can be conveniently and temporarily attached to a tape measure to aid in measuring a workpiece. The apparatus has a means of engaging a workpiece at one end of a length to be measured, and has a means of removably attaching to the tape measure. The attachment mechanism consists of a rigid, substantially flat member which is designed to rest under the tape, with two tabs protruding upwards from said rigid member. Each tab has at least one kerf formed in the side of that tab which is adjacent to the tape when the rigid member rests under the tape, so that the curving edges of the tape fit into those kerfs, holding the apparatus in place. In this manner, the apparatus is conveniently attachable to and removable from the tape. Furthermore, while the apparatus is attached to the tape, the apparatus adds stability to the tape, by reinforcing the position of the curving edges of the tape. Also, the apparatus can be conveniently slid along the tape to whatever position is appropriate for engaging a workpiece to be measured. The engagement mechanism of the apparatus consists of a rigid, substantially flat member which is attached to the attachment mechanism at a substantially ninety degree angle, so that the rigid engagement member is substantially perpendicular to the tape. One surface of the engagement member is designed to rest against and engage a workpiece to be measured, in a manner which does not harm or mar the workpiece. The surface engaging the workpiece can be tacky, or can have a protrusion designed to insert into a hollow workpiece, such as a pipe.

9 Claims, 4 Drawing Sheets

TAPE MEASURE ATTACHMENT

BACKGROUND OF THE INVENTION

This application is based on U.S. Provisional Application Ser. No. 60/410,906, filed Sep. 13, 2002.

REFERENCE TO RELATED APPLICATIONS

1. Technical Field

This invention pertains to an attachment for a standard tape measuring device to assist in conveniently measuring by temporarily holding the tape against one edge of a workpiece to be measured.

2. Background Art

A standard tape measuring device, referred to herein as a "tape measure" is typically used to measure the length of a workpiece by holding one end of a retractable tape at one edge of the length to be measured, and pulling the tape from inside the tape measure canister until sufficient tape lies adjacent to the workpiece along the length to be measured. The distance of the tape, and of the workpiece along which the tape is lying, can be easily read from marked measurements along the tape. When measurements greater than a few feet are being made, two hands are typically required to make the measurement: one to hold the end of the tape at one edge of the workpiece and another hand to pull the canister, unrolling the tape to the proper position at the other end of the length to be measured. When measuring significant distances, two persons may be required: one to hold the leading end of the tape and the other to hold the canister and read the measurement at the other end of the tape. A tape extended over a significant distance may fold and fail to remain in place unless someone holds both the leading end and the canister of the tape measure.

A number of attachment devices are known in the prior art for attaching to a measuring tape to assist in the measurement process. Some tape measures contain soft, flexible, flat tape. Attachment devices described in U.S. Pat. No. 14,947 to Ballou, U.S. Pat. No. 1,798,476 to Langsner, U.S. Pat. No. 3,473,235 to Quenot, and U.S. Pat. No. 3,965,579 to Woods are designed for such a tape measure, but would not be useful with a metal semi-rigid tape measure. A metal tape measure typically has upwardly sloping curved edges which provide stability for the tape and make it easier to measure a length without the tape folding. The stability of such metal tape measures can thus afford a more accurate measurement than a flexible, flat tape.

Most metal tape measures are designed with a tab on the leading end for engaging a workpiece to be measured. The size and shape of such tabs varies, but typically the width of the tab is no bigger than the width of the tape itself. As a result, the tab does not contact a sufficiently large surface of the workpiece to reliably hold the tape against one edge of the workpiece. On the other hand, that tab makes it difficult to fit attachments onto the tape, or may interfere with an accurate measurement when an apparatus is attached to the tape. For example, the device of U.S. Design Pat. No. 320,168 cannot be conveniently attached to a tape with a standard leading tab. The attachment device of U.S. Pat. No. 5,894,677 adds length beyond the tab on the end of the tape and thus can result in inaccurate measurements.

The tab typically constructed on the leading edge of a metal tape measure is used as a point of connection by some measuring aids. For example, devices described in U.S. Pat. Nos. 6,442,863 and 6,546,644, both to Poineau et al, and U.S. Pat. No. 6,568,099 to Bergeron each anticipate being attached to a tape measure by using a hole frequently found in the tab at the leading edge of the tape. However, since different tape measures have different sizes and placements of a hole in the leading tab of the tape, such attachments must be specially made for each particular type and brand of tape measure, and are not easily interchangeable with a variety of different tape measures.

Other devices for engaging a workpiece to be measured rely on a mechanism which is forced into the workpiece to hold the tape measure in a particular place. Examples of such mechanisms are taught in U.S. patent application 2002/0011008, and U.S. Pat. No. 5,421,100 to Leore, U.S. Pat. No. 5,600,894 to Blackman et al, 5,845,412 to Arcand, 6,295,739 to Kraft, and 6,370,790 to Stenger. Although these devices are useful for measuring certain surfaces, such as unfinished wood, they leave a mark in the workpiece and are thus unacceptable for measuring finished materials or workpieces which should not be marked.

A number of other devices are known in the prior art which attach to measuring tape devices for a variety of purposes other than holding the tape in a particular position for measuring a workpiece. For example, U.S. Pat. No. 6,510,622 to Laughlin et al. describes a wheeled mechanical measuring tape device for moving a measuring tape over rough surfaces. U.S. Pat. No. 6,115,931 to Arcand teaches a tape measure with a permanently attached swivel end assembly. U.S. Design Pat. No. 474,702 to Levinson describes a vertical knife guide for mounting on a tape measure. U.S. Pat. No. 5,782,007 to Harris concerns a tool guide for attaching to a tape measure. Similarly, U.S. Pat. No. 6,223,443 to Jacobs describes a pattern developing tool which can be attached to a tape measure.

While each of these devices is useful for a particular purpose, none provides an easily attachable and detachable device for using with any retractable, metal tape measure, to engage a workpiece without marring that workpiece, and thus allow for easier one-handed operation of the tape measure.

DISCLOSURE OF THE INVENTION

SUMMARY OF THE INVENTION

An object of this invention is to provide a new and useful apparatus which can be removably attached to a standard tape measuring device to aid in holding the tape in a position useful for measuring a workpiece.

Another object of this invention is to provide such an apparatus which can be used with a variety of brands and designs of typical tape measures.

Yet another object of this invention is to provide such an apparatus which provides additional strength and stability for the leading end of a tape measure, stabilizing the tape and decreasing wear and tear on the tape.

Yet another object of this invention is to provide such an apparatus which can be moved along the retractable tape to a position best suited for engaging a workpiece to be measured.

Yet another object of this invention is to provide such an apparatus which is easily removable and interchangeable to allow for different means of contacting different types of workpieces. For example, one embodiment of the invention is designed to engage a flat, relatively thick surface, while an interchangeable embodiment of the invention is designed to engage thin material or a hollow end of a pipe.

Yet another object of this invention is to provide such an apparatus which does not leave marks or otherwise harm the workpiece being measured.

The novel apparatus of the claimed invention is a removably attachable apparatus for attaching to a typical, retractable, metal measuring tape. The device can be used with a variety of different measuring tapes. Different versions of the apparatus can be interchangeably used on the same tape measure, to provide different ways of engaging a workpiece to suit the shape and size of the particular workpiece being measured.

The attachable apparatus consists of two primary components: a mechanism for attaching the apparatus to a tape measure and a mechanism for engaging a workpiece to be measured.

Typical metal tape measures have a retractable tape with a slight upward transverse curvature. This design provides support when the tape is extended, lessening the chance of the tape folding or buckling when it is extended. The claimed invention advantageously attaches to the upwardly curved edges of the tape in a manner which allows the claimed apparatus to be easily attached to and removed from the tape, while providing additional stability to the tape when attached. The tape measure attachment holds the upwardly curving edges of the tape in a rigid position, enhancing the stabilizing effect of the tape design while the tape is extended.

The attachment mechanism of the apparatus conveniently includes a rigid, substantially flat member which resides adjacent to and immediately beneath the extended tape. From this rigid member two tabs extend upwards, with sufficient distance between the tabs for the tape to be inserted, so that each of the curved edges of the tape is adjacent to one of the tabs. Slight indentations, sloping slightly downward, referred to herein as kerfs, are formed in the tabs, to receive and engage the edges of the tape. The tape can be easily snapped into and out of the attachment mechanism, at any place along the extended tape.

Extending downward from the attachment mechanism is an engagement mechanism designed to hold the tape in a convenient location with respect to measuring a workpiece. The engagement mechanism will typically consist of a rigid, substantially flat piece which extends downward perpendicular to the bottom of the tape. Frequently, the flat engagement mechanism will be substantially rectangular in shape. This engagement mechanism can be constructed as a single piece with the attachment mechanism, or can be separately constructed and then attached to the attachment mechanism. Ideally, the engagement mechanism is wider than the tape itself, thus allowing the engagement mechanism to significantly engage the edge of a piece of material to be measured, in a more stable manner than the small tab which is typically found on the leading end of a tape measure.

The back surface of the engagement mechanism can be shaped and textured in a variety of ways. Indeed, a variety of such surfaces, each suited to engaging a particular type or size of workpiece, can be provided so that differing attachments are interchangeably used on the same tape measure, depending on the type of workpiece being measured. Because it is anticipated that a variety of different surfaces on the engagement mechanism would be useful, it is particularly important that the apparatus can be easily attached to and removed from a tape, allowing for interchangeability.

For example, a tacky rear surface of the engagement mechanism can be provided, allowing the apparatus to engage and hold to the edge of such materials as wood and plastic. For such purposes, the rear surface of the engagement mechanism can be coated with a soft and somewhat sticky rubber material to enhance the engagement mechanism's grip on a hard, flat edge of a workpiece. Such a surface would advantageously allow engagement with a finished surface of a workpiece without scaring that surface.

Another example of a suitable surface of the engagement mechanism would be one having at least one protrusion or nub extending backwards from the apparatus, suitable for inserting into a hollow workpiece such as a pipe to hold the apparatus, and thus the tape measure, at the end of that pipe. One or more projections from the engagement mechanism, positioned under and substantially parallel to the tape, can be inserted into a pipe in such a manner that the projections engage a lip or edge of the pipe, holding the tape securely above the pipe. Ideally, these protrusions extend into the pipe adjacent to the interior of the pipe, creating a snug fit for the engagement mechanism and positioning the tape adjacent to the exterior of the pipe. Once these protrusions are inserted into the hollow pipe, the engagement mechanism is thus held firmly against the end of the pipe, allowing an operator to pull the canister of the tape measuring device indefinitely until a desired length of tape is extended along the pipe being measured, without manually holding the end of the tape against the end of the pipe. Similarly, protrusions extending backward from the engagement mechanism could slide under a thin piece of material like sheet metal, holding the tape adjacent to that metal workpiece.

In a preferred embodiment of the invention, the attachment mechanism and engagement mechanism are constructed of a single piece of rigid plastic, but other rigid materials such as metal could be used.

To avoid any inaccuracy in measurement, the apparatus must be placed in a location along the tape so that the rear surface of the engagement mechanism, which touches the workpiece, is aligned in the proper position so that the leading end of the tape measure is adjacent to the edge of a length to be measured. In some situations, this may mean placing the apparatus at some point on the tape other than the leading end of the tape. For example, in measuring a distance from one wall to another, it may be advantageous to hold the tape measure in a position above a desk which is located several inches from the wall. The apparatus could be slid along the tape measure to a position which enabled the leading end of the tape to be adjacent to the wall, while the apparatus engaged and held a position along the edge of the nearby desk. Because the apparatus can be easily moved into a stable position along the tape, it can be useful in such situations to allow one person to use the tape measure to measure a distance significantly longer than he or she can reach with two hands.

It is anticipated that the apparatus will frequently be used at the leading end of the tape, engaging the edge of a workpiece to be measured. In these instances, it is important for accurate measurements that the rear surface of the engagement mechanism be aligned directly below the leading end of the tape. An indentation formed in the front surface of the engagement mechanism can be formed with a depth suitable for receiving a tab extending downward from a typical tape measure, to align the rear surface of the engagement mechanism directly below the leading edge of the tape. This indentation may take the form of a hole formed through the engagement mechanism, suitable in size for receiving the leading tab of the tape measure. In this fashion, the tape will accurately measure from the edge of the workpiece to which the apparatus is engaged.

DETAILED DESCRIPTION OF THE PREFERRED EMBODIMENT

The present invention concerns an attachment for a standard tape measure. In the following description, numerous specific details are set forth in order to provide a thorough understanding of the present invention. It will be obvious, however, to one skilled in the art that the present invention may be practiced without these specific details. Some well-known methods and structures have not been set forth in order not to unnecessarily obscure the description of the present invention.

Figure 1:
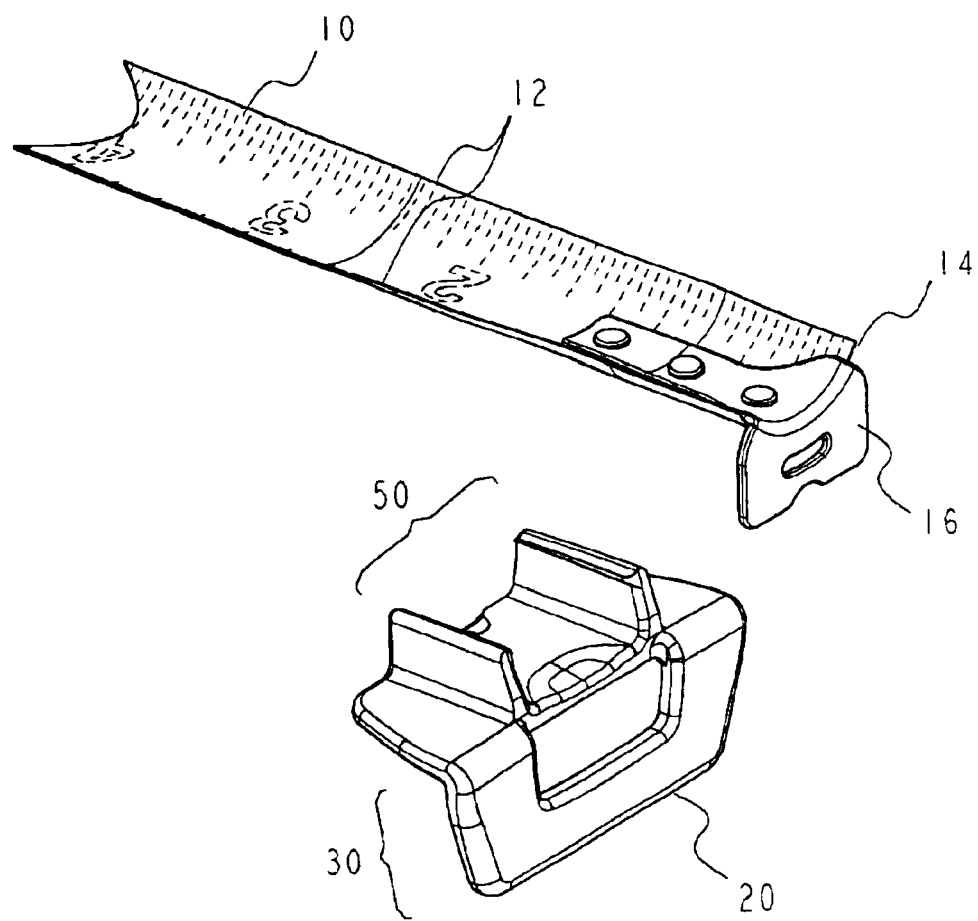
FIG. 1 is a perspective view of a tape measure attachment according to the present invention and a measuring tape to which the attachment may be attached.
Figure 2:
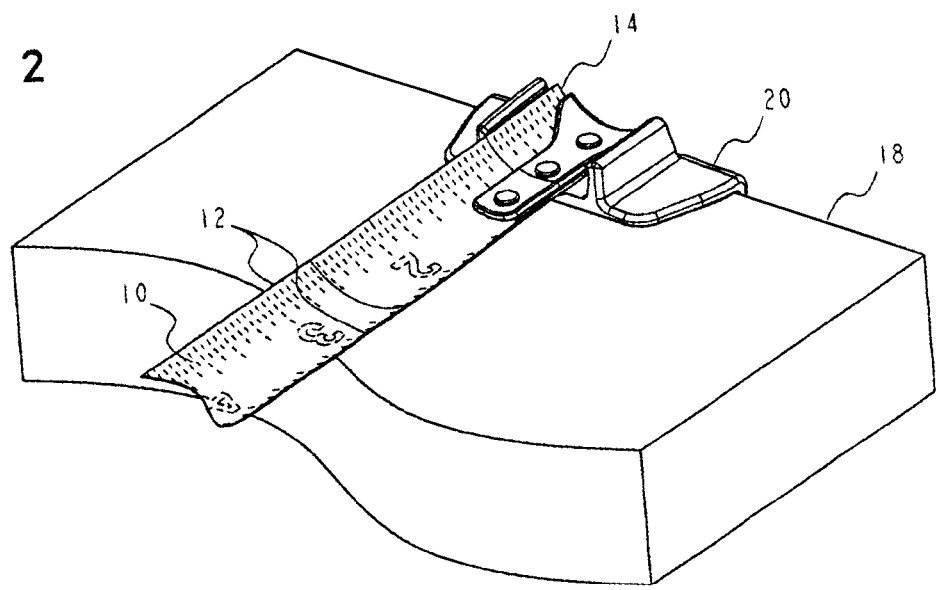
FIG. 2 is a rear perspective view of a tape measure being used to measure a workpiece, with an apparatus attached to the tape according to the present invention.
Figure 3:
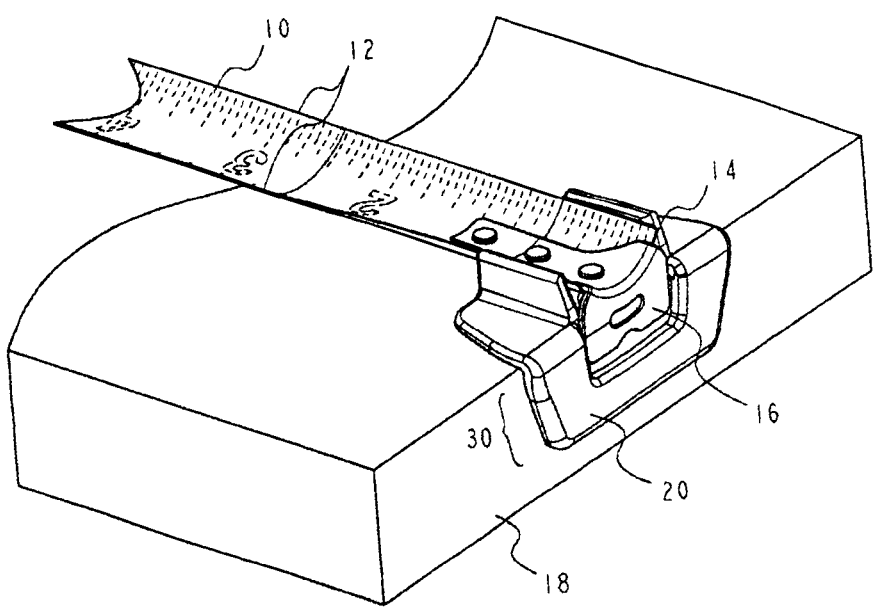
FIG. 3 is a front perspective view of a tape measure being used to measure a workpiece, with an apparatus attached to the tape according present invention.

As is best demonstrated by FIG. 1, an apparatus 20 for removably attaching to a typical measuring tape 10 consists of an attachment mechanism 50 and an engagement mechanism 30. The apparatus 20 is designed to be conveniently attached to or removed from a measuring tape 10 as shown in FIGS. 2 and 3. The measuring tape 10 typically has slightly upwardly curving edges 12, a leading end 14, and a tab 16 extending downwardly perpendicular to the tape 10. The apparatus 20 engages a workpiece 18 to be measured, allowing the tape 10 to be held in an appropriate position adjacent to the workpiece 18 as the tape 10 is extended to measure the length of the workpiece 18.

Figure 4:
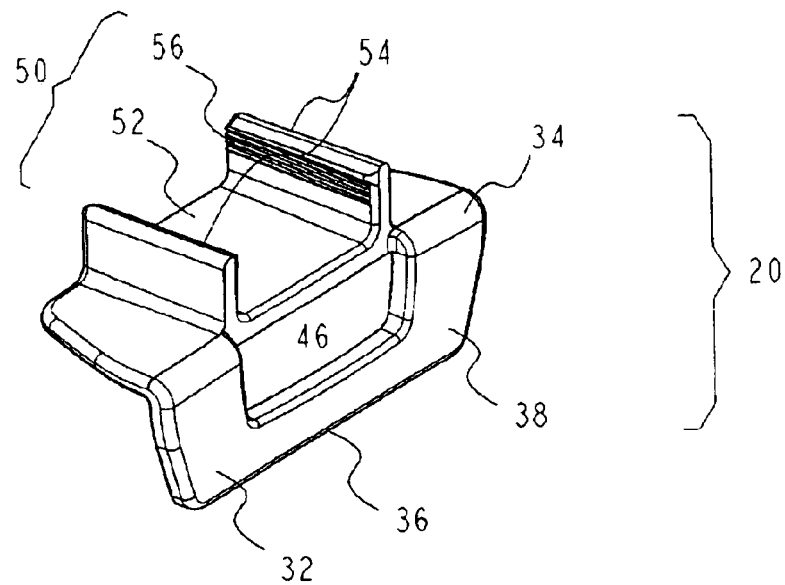
FIG. 4 is a front perspective view of an apparatus for attaching to a measuring tape, according to the present invention.

The attachment mechanism 50 fits onto the underside of the tape 10. As shown in FIG. 4, the attachment mechanism 50 includes a rigid attachment member 52 from which dual tabs 54 extend upward, substantially perpendicular to the attachment member 52. The tabs 54 are spaced apart from each other in a manner suitable for inserting a standard metal tape 10 in between and adjacent to each tab 54, as shown in FIG. 3.

One or more indentations or kerfs 56, are formed in the tabs 54, as shown in FIG. 4. Each kerf 56 is slanted to receive a curving edge 12 of the measuring tape 10. In this manner, the attachment mechanism 50 enhances the rigidity of the tape 10 which is afforded by the curving edges 12 and provides further stability to the tape 10, while holding the apparatus 20 in a position along the tape 10 suitable for measuring the workpiece 18.

The attachment mechanism 50 allows the apparatus 20 to be held in place on the tape 10, but is flexible enough to allow a user to manually slide the apparatus 20 along the tape. Thus, the apparatus 20 can be attached to the leading end 14 of the tape 10, or at any point along the extended tape 10.

The rigid attachment member 52 is generally perpendicular to the engagement mechanism 30. In a preferred embodiment, the engagement mechanism 30 forms an eighty-nine degree angle with the rigid attachment member 52, but is pulled into a right angle position when the engagement mechanism 30 is held against a workpiece 18. The spring-like tension created by pulling the engagement mechanism 30 into a perpendicular position with respect to the attachment member 52 serves to further hold the engagement mechanism 30 in place with respect to the workpiece 18.

Figure 5:
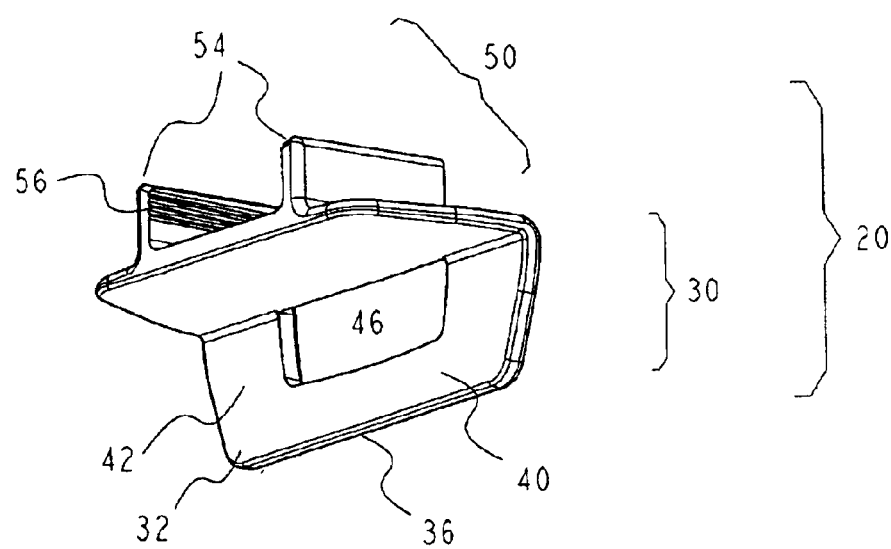
FIG. 5 is a rear perspective view of an apparatus for attaching to a measuring tape, according to the present invention.
Figure 6:
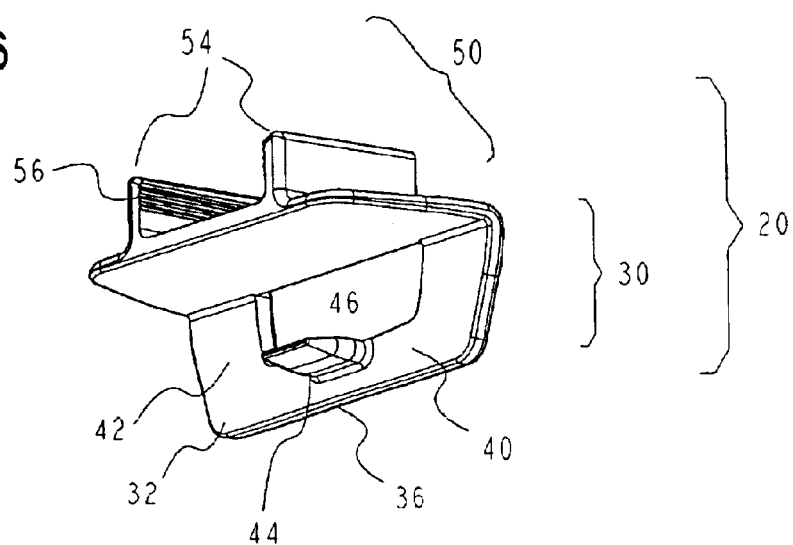
FIG. 6 is a rear perspective view of an apparatus for attaching to a measuring tape, suitable for measuring a hollow or thin workpiece, according to the present invention.
Figure 7:
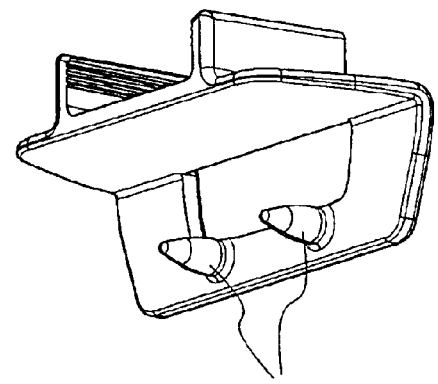
FIG. 7 is a rear perspective view of another embodiment of an apparatus for attaching to a measuring tape, suitable for measuring a hollow or thin workpiece, according to the present invention.

The attachment mechanism 50 and the engagement mechanism 30 can conveniently be constructed as a single piece or manufactured as separate pieces which are then attached. The engagement mechanism 30 has a rigid and significantly flat engagement member 32 with a front face 38, as shown in FIG. 3, and a rear face 40, as shown in FIGS. 5–8. The surface 42 of the rear face 40 is advantageously constructed so as to engage a workpiece 18, holding the tape measure 10 in place above that workpiece 18, without marring the workpiece 18. Thus, it is suitable to provide a rubber surface 42 for use in measuring finished workpieces 18. A tacky surface 42 may be particularly useful for gripping a workpiece 18. As shown in FIG. 6, a single projection 44 from the rear face 40 of the engagement member 32 can be provided to hold a hollow or thin workpiece 18 for measuring. Alternatively, as shown in FIG. 7, multiple projections 44 from the rear face 40 can be provided to slide under a thin workpiece 18 or to engage the interior of a pipe or other hollow workpiece 18.

Figure 8:
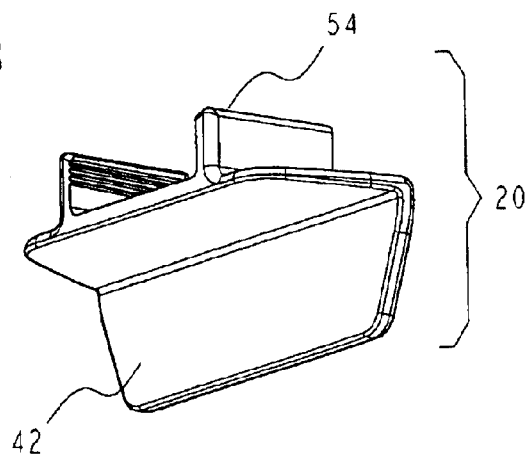
FIG. 8 is a rear perspective view of another embodiment of an apparatus for attaching to a measuring tape, according to the present invention.

The apparatus 20 can be attached to a tape 10 at the very end 14 of the tape 10 so that the edge of the leading end 14 is aligned directly above the edge of a workpiece 18 to be measured. To avoid any inaccuracy in measurement which might be caused by the engagement member 32 being inserted between a tab 16 of the tape measure 10 and the workpiece 18, an indentation 46 can ideally be provided in the rigid engagement member 32. In this manner, the tab 16 fits into the indentation 46, allowing the leading end 14 of the tape 10 to be aligned directly above the edge of a workpiece 18 when the apparatus 20 is held against that workpiece 18. The indentation 46 may form a hole in the rigid engagement member 32, as shown in FIGS. 5–6, or may be formed in only the front face 38 of the engagement member 32, as shown in FIG. 8.

The novel tape measure attachment has been described in detail with particular reference to preferred embodiments thereof. As will be apparent to those skilled in the art in the light of the accompanying disclosure, many substitutions, modifications, and variations are possible in the practice of the invention without departing from the spirit and scope of the invention.

I claim:

1. A removable, attachable apparatus for attachment to a measuring tape, the measuring tape having upwardly curving edges and a downwardly substantially perpendicular tab at a leading end, said removable, attachable apparatus comprising:

a. workpiece engagement means for engaging a workpiece to be measured, said engagement means being substantially perpendicular to and beneath said mea suring tape and having at least one surface suitable for engaging said workpiece, b. attachment means for removably attaching said work engagement means to the curving edges of the measuring tape, wherein said attachment means comprises:
  i. rigid attachment member attached to said workpiece engagement means, suitable for being held adjacent to and beneath the measuring tape,
  ii. two rigid attachment tabs extending upwardly from said rigid attachment member adjacent to the curving edges of the measuring tape, and
  iii. at least one kerf formed in each rigid attachment tab for receiving a curving edge of the measuring tape.

2. An apparatus as described in claim 1, wherein said workpiece engagement means further comprises:
  a. rigid engagement member having a top, bottom, front face, and rear face, aligned with said faces substantially perpendicular to the measuring tape, and
  b. said rear face having a surface suitable for engaging the workpiece.

3. An apparatus as described in claim 2, wherein said rigid engagement member has a width greater than the distance between the curving edges of the measuring tape.

4. An apparatus as described in claim 2, wherein said surface suitable for engaging the workpiece is tacky.

5. An apparatus as described in claim 2, further comprising at least one projection extending backwards from said rear face of said rigid engagement member.

6. An apparatus as described in claim 2, wherein an indentation formed in said front face of said rigid member is suitable for receiving the tab of the measuring tape.

7. An apparatus as described in claim 2, wherein a hole formed in said rigid member is suitable for receiving the tab of the measuring tape.

8. An apparatus as described in claim 2, wherein said rigid attachment member and said rigid engagement member comprise a single rigid perpendicular piece.

9. An apparatus as described in claim 1, wherein said attachment means is slideable along said measuring tape.

* * * * *